No. 632,903. Patented Sept. 12, 1899.
C. L. MARSHALL.
WICK FOR INCANDESCENT OIL LAMPS.
(Application filed Jan. 14, 1898.)
(No Model.)
Fig. 1.
Fig. 3.
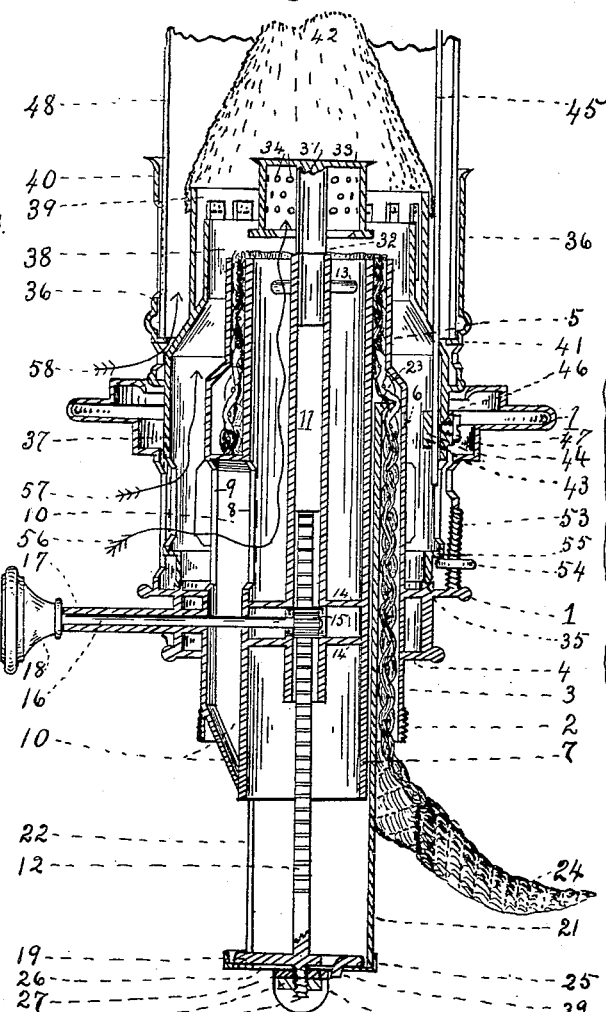
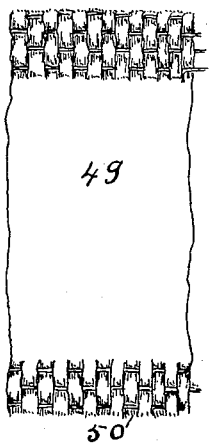
Fig. 2.
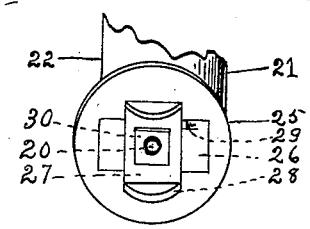
Fig. 4.
Witnesses
Frederick B. Hill.
Gertrude Martin Hill.
Inventor
Charles L. Marshall
By his Attorney
Myron Francis Hill
THE NORRIS PETERS CO., PHOTO-LITHO., WASHINGTON, D. C.

UNITED STATES PATENT OFFICE.

CHARLES L. MARSHALL, OF NEWARK, NEW JERSEY, ASSIGNOR TO THE NEW JERSEY WICK COMPANY, OF SAME PLACE.

WICK FOR INCANDESCENT OIL-LAMPS.

SPECIFICATION forming part of Letters Patent No. 632,903, dated September 12, 1899.

Application filed January 14, 1898. Serial No. 666,616. (No model.)

*To all whom it may concern:*

Be it known that I, CHARLES L. MARSHALL, a citizen of the United States, residing at Newark, county of Essex, State of New Jersey, have invented a new and Improved Incandescent Oil-Lamp, of which the following is a full, clear, concise, and accurate description, reference being had to the accompanying drawings.

In the incandescent oil-lamp heretofore devised the great objection is the unreliability and unsteadiness of the wick in its oil-carrying power. When the wick is properly adjusted to its lamp, it will behave properly for a few hours, perhaps twenty-four or thereabout, depending upon the particular wick. Then the wick begins to show its loss of capillary power and its clogging by a reduction in the amount of oil carried to the flame, which then smokes, depositing carbon on the mantle and destroying its illuminating power and sometimes causing accidents. The lamp as at present proposed, with the ordinary cotton wick of commerce, is therefore a commercially useless device.

The object of my invention is to substitute in the incandescent lamp a wick that is not open to these objections. One of the reasons why the ordinary cotton wick clogs is its ability to hold water in suspension, thus preventing the passsage of oil. This is, perhaps, the main difficulty. In my patent of May 11, 1897, No. 582,581, is described a wick which will not clog with water and which has a steady carrying power; but the great difficulty with the use of that wick in this kind of lamp is that it will carry too much oil, and from the time the lamp is lighted the supply increases, so that for a long period the lamp cannot be left alone without smoking, for the incandescent burner requires a small but regular supply.

In order to produce a successful wick, it is necessary to prevent it from holding water in suspension and to choke and fix its carrying capacity. To secure this result, I have reduced and choked the carrying capacity of the wick patented by me by the introduction of a choking substance into the body of the wick.

In Figure 1 is shown a sectional view of the construction of the incandescent burner, which, aside from the wick, is not my invention. In Fig. 2 is shown one form of my wick reduced in size. In Fig. 3 is shown a preferred form of my wick in section. In Fig. 4 is shown the under side of the adjusting-cylinder.

In Fig. 1 I have shown a sectional view, but have not shown in full all the details of the incandescent burner to which my wick is specially applicable. Some of the details are well known to the trade, and the others are well shown and described in the patent to Lucas, No. 597,682, dated January 18, 1898. I will therefore refer to the general features of construction of the lamp briefly.

The lamp consists in a body or framework 1, having screw-threads 2, by which the framework is fastened to the oil-tank. (Not shown.) Within the framework is the cylinder 3, mounted rigidly on the webbing 4. This cylinder confines part of the wick on the outside. Upon the top of this cylinder is a top piece 5, fastened on by a bayonet-joint 6. The function of this top piece is to surround the top of the wick on the outside. Within and concentric with this cylinder 3 is a second cylinder 7, which is provided with a slot 8, registering with a slot 9 in the cylinder 3. The two cylinders 3 and 7 are firmly connected together by a web 10 around the outside of the two slots, as shown. Thus an air-passage is provided from the outside of the cylinder 3 to the inside of cylinder 7 and is shut off from the space between the cylinders which is reserved for the wick 24.

Within and concentric with the second cylinder 7 is a tube 11, preferably rectangular in shape, so as to fit a rack 12, adapted to slide up and down in the tube. The upper end of the tube is held in place within the cylinder 7 by three posts 13, and the lower end is held in place by the two disks 14, forming a chamber between them. Within this chamber the tube is cut away to allow a pinion 15 to operate the rack 12 up and down to adjust the wick. The pinion 15 is mounted upon an arbor 16, turning in a tube 17, and is worked by a handle 18. The tube 17 is rigidly mounted upon the framework 1, as shown.

The rack 12 at its lower end is provided with a firmly-mounted disk 19 and screw-threads 20. Smoothly sliding on the outside of cylinder 7 is a third cylinder 21, having a slot 22, which allows for the web 10 between the first and second cylinders. The cylinder 21 has sharp points 23 at its top to press into the wick 24 and carry the wick up and down whenever the cylinder 21 is moved. The cylinder 21 is removably connected with the rack 12. The cylinder end is mounted rigidly in the cap 25, which has a slot 26. A cross-piece 27, with wings 28 to turn it with, is pivoted on the screw-threads 20, passed through the slot 26, and turned at right angles with the slot, so that it abuts against the offset lug 29. It is held from dropping off the screw-threads by the nut 30. In this way the cylinder 21 and rack 12 are so connected that when the pinion 15 is turned by the handle 18 the rack 12 causes the cylinder 21 and the wick 24, carried thereby, to move with it. In this way the wick is adjusted for the best flame.

In the top of the tube 11, which is cylindrical above the range of the rack, is removably mounted a post with a limiting-shoulder 32 to prevent its going down too far. Upon this post is rigidly mounted the gasifier—a chamber 33, with apertures 34.

Upon the circular groove 35 rests the chimney and mantle support 36. This support has a main cylindrical portion 37, with three top cylindrical parts 38, 39, and 40, the latter two provided with air-holes.

Upon the framework 1 is mounted rigidly at both ends a screw 53, upon which a thumb-nut 54 works and raises the support 36 off the groove by means of the shoulder 55. This is to adjust the mantle to the flame as regards position.

The outer cylindrical portion has lugs 41, three or four in number, to support the chimney 48. The middle cylindrical portion 39 is to fit inside the bottom of the mantle and steady it in position. The inner portion 38 assists in forming air-passages.

Mounted upon the main cylindrical portion 37 of the support is a block of metal with two holes at right angles to each other, a hole 44 to support the mantle-supporting rod 45, and another hole 46, threaded for the set-screw 47, which holds the mantle-rod in its adjusted position. The upper parts of the chimney, mantle, and mantle-rod are broken away in the drawings. They are similar to the same elements in the Welsbach gas-burner.

Fig. 2 shows one form of my wick. The blank space 49 upon the threads 50 show where the starch has been applied.

In Fig. 3 is shown the preferable form of my wick in sectional view. The parts 51 and 52 are where the starch is applied. The starch at 51 is to give a smooth top edge to the wick, which assists an even flame and prevents a projecting thread from causing the lamp to smoke. The starch at 52 is to choke, and thus fix the flow of oil. In this wick the starch preferably does not go through the wick entirely, but only partially through. It may, if necessary, go entirely through if the starch is thin enough to prevent entire choking, or be applied only on the surface, according to the necessary adjustment of the particular make of wicks to the particular make of lamps. The amount of starch and the width or the depth or place of application are entirely dependent on the necessities of the particular case. In the construction shown the oil-supply should be cut down between one-half and one-third.

Although I mention starch as the substance used to choke or obstruct the free passage of the oil, it is obvious that any material may be used that is insoluble in the oil used for burning at the ordinary temperature and that will stay in place.

In producing this wick starch is dissolved in water and brought to the boiling-point. It is made thick and heavy. While the starch is hot, the wicks, which may be the ordinary cotton wicks of commerce, are covered or filled with the starch to the required depth and width and then placed in an oven to bake at a temperature of 400° Fahrenheit, or thereabout, until dry and properly relieved of volatile matter by distillation and carbonized. At this temperature twelve hours' treatment gives excellent results. By increasing the heat and reducing the time of treatment, or vice versa, within certain limits, similar results may be obtained. This process does not affect the choking power of the starch even though it may be partially carbonized. This process is inseparable from this product. It differs from that of my patent of May 11, 1897, No. 582,581, in having the previous application of starch or other insoluble matter baked and hardened into the wick simultaneously with the distilling or to the distilling and carbonization. The apparatus of that patent may be used. The receptability of starch to water is affected by this process, so that the starch will hold no more water than the wick. It is preferable to have the starched part of the wick raised above the level of the oil in the tank to get its full regulating power.

In operation, referring to Fig. 1, the wick is raised just enough to light at the top and is left alone for a half minute or so after lighting till the flame rises about to the top of the gasifier and then is raised again till it nearly touches the gasifier. When this happens, the flame disappears and is drawn into the chamber of the gasifier by the air-currents and emerges colorless from the holes 34, from whence it spreads upward on the inside of the mantle, making it incandescent. The heat of this combustion assists in causing the oil from the wick to become gas, thus aiding in the intensity of the heat of the colorless flame.

The air-currents are several in number. The arrow 56 indicates the current supplying the chamber of the gasifier with the air that mixes with the gas from the oil. The arrow 57 indicates another current which supplies more air, some of which doubtless follows the gas from the wick into the gasifier and the rest adding to the mixture which emerges from the holes 34. Another air-current enters, as indicated by the arrow 58, and assists combustion at the mantle and prevents the chimney from becoming too hot. The various cylindrical parts 37, 39, and 40 of the support 36 and the framework 1 are provided with holes for these air-passages.

It is clear that the wick (referring to Fig. 3) may have the starch spread upon both the inside surface or the outside surface, as at 51. This is only upon the surface, however, leaving the threads at 50 free to hold and carry oil. It will be noticed that the starch at 52 is shown as extending deeper into the wick than at 51. When the light is burning, this freedom of the threads 50 to hold oil is not made use of, for they are drained of oil as much as possible, so that the light depends upon the oil that continues to struggle through the free space at 52. When, however, the light is extinguished, this space in the wick at 50 soon fills with all the oil it can hold, and the space acts as a sort of reservoir for the sudden demand for oil to heat the lamp when it is lighted again. Without this reservoir it takes a couple of minutes to get sufficient heat for incandescent purposes; but with this reservoir, if large enough, a half-minute suffices.

It is desirable to have the part of the wick below the choking portion 52 full size to bring to the choked parts the full supply of oil. Otherwise the consumption of oil in the tank and the lowering surface will vary the carrying power of the wick. This will cause smoking.

It is obvious that there are many different ways in which the wick may be manufactured, and although I prefer the particular process described, on account of its economy, I may use other processes for making it, and the wick, regardless of the particular process used and the particular materials employed, of which there may be a great diversity, lies within the scope of my invention. This wick is suitable for all kinds of hydrocarbon or oil lamps or stoves which work upon the Bunsen principle or in which a steady but low carrying power is necessary. Thus it appears that my wick rests upon two great features of value: First, the wick must have its capillary power rendered uniform—that is, it must be "steady." My wick to become steady has been distilled and carbonized, either or both; but it is obvious that any other process or treatment which secures the same result is an equivalent. In order to be steady in its capillary power, the wick must have its ability to hold water in suspension, while carrying oil to the flame, destroyed, for water is found in considerable quantity in burning oil, and if the wick will take it up and hold it the wick will fail to have a steady oil-carrying power. After awhile it will carry less oil to the flame, and the amount reduces with age; so that "a wick steady in its oil-carrying capacity" is a wick that has been rendered incapable of choking by water and may have the various other attributes of my distilling and carbonization process or not, as desired. The second great feature that forms the other element of this wick is the choking idea, so that the carrying power is adjusted and fixed for the particular lamp or burner. This choking of the wick may be accomplished in numerous ways, and the particular way makes no difference as long as the choking is secured by impregnating the wick with a substance insoluble in the oil used in the fount.

Another feature of my invention, which includes the two preceding features, is the combination of this wick with the incandescent lamp. Of course many of the details of the structure described may be varied at will, my invention depending upon use with some means of conveying a powerful heat to a substance which becomes greatly heated and thus gives service. In the particular form of lamp described in this case the gasifier assists in combustion and in heating the mantle to give light. Some other form and principle of gasifier may be used and the mantle heated may be, for example, clay or porcelain, for the purpose of giving heat in place of light. Such different forms and substances I designate as "mantles" for want of a better term; and such mantles may be supported in different ways.

What I claim, and desire to secure by Letters Patent, is—

1. In a Bunsen oil-burner a wick steady in its oil-carrying capacity in combination with a choking substance insoluble in oil fixed in the body of said wick for the purpose of fixing its carrying capacity.

2. In an oil-burner a wick steady in its oil-carrying capacity in combination with an artificial choking device of starch to fix the supply of oil through said wick.

3. The process of manufacturing wicks which consists in filling the fibers of a wick of vegetable material with a choking substance insoluble in oil, and subjecting such a combination to distillation by heat to remove hydrocarbons and impure substances and to bake said choking substance.

4. The process of manufacturing wicks which consists in filling the fibers of wicks with a choking substance insoluble in oil and subjecting such a combination to distillation and carbonization by heat to remove hydrocarbons and impure substances and to bake said choking substance and partially carbonize the wicks.

5. The process of manufacturing wicks which consists in filling the fibers of wicks with dissolved starch and subjecting such a combination to distillation by heat to remove hydrocarbons and impure substances, and to bake said choking substance.

6. The process of manufacturing wicks which consists in filling the fibers of wicks with dissolved starch and subjecting such a combination to distillation and carbonization by heat to remove hydrocarbons and impure substances and to bake said starch and partially carbonize the wicks.

7. In combination, an incandescing mantle, a gasifier, air-passages, and a wick steady in its carrying capacity and choked with starch.

8. In combination, a mantle, a gasifier, air-passages and a wick, steady in its oil-carrying capacity and adjusted in its carrying capacity to said gasifier and air-passages by a choking substance insoluble in oil, fixed in the body of said wick.

9. In a Bunsen oil-burner, a wick having its fibers impregnated with a choking substance, an unchoked portion between the impregnated portion and the top, to act as a reservoir of oil when the wick is unlighted, for the purpose of affording a larger amount of oil in lighting the lamp.

Signed this 8th day of January, 1898.

CHARLES L. MARSHALL.

Witnesses:
CHARLES F. DAVIES,
MYRON FRANCIS HILL.